Figure 1:
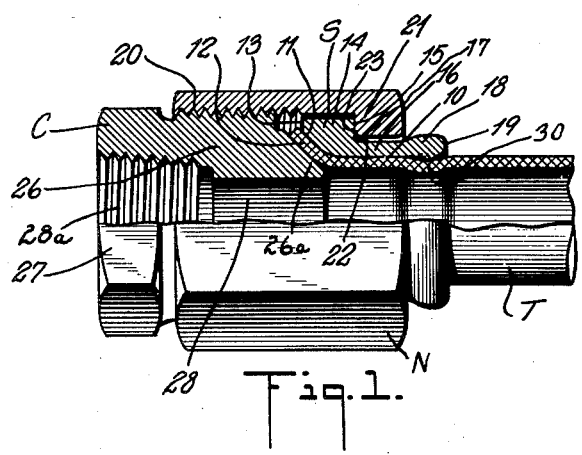

March 8, 1949.  F. JACOBSON  2,463,625

ANTIVIBRATION COUPLING FOR TUBING

Filed Aug. 17, 1946

INVENTOR.
FRANZ JACOBSON
BY
Kenyon & Kenyon
ATTORNEYS.

UNITED STATES PATENT OFFICE 2,463,625

ANTIVIBRATION COUPLING FOR TUBING

Franz Jacobson, New York, N. Y.

Application August 17, 1946, Serial No. 691,208

3 Claims. (Cl. 285—86)

This invention relates to a tube coupling designed particularly to absorb the vibration in tubing lines and thereby to prolong the life of the tubing to which the coupling is applied.

An object of the invention is to provide a coupling wherein the tubing is protected against vibration at its most vulnerable portion which is located near its flared end. This portion is vulnerable because of the unavoidable injury to the metal of the tubing when the latter is flared.

The coupling constituting the subject matter of this invention consists of a connector, a nut and a sleeve. The connector is of conventional design such as is used for so-called flare fittings. The nut is also of more or less conventional design, differing, however, in that its internal thread is slightly longer than is usual in such nuts, and furthermore, in that it has rounded edges adjacent the opening in its base for purposes to be presently described. The sleeve has special design and construction adapted particularly for protection of the tubing against vibration at its flared end as will be described.

Another object of the invention is to provide a novel coupling having separable parts that may be quickly and simply assembled with tubing.

A further object of the invention is to provide a coupling having a novel sleeve member that is simple and cheap to manufacture.

To the accomplishment of the foregoing and such other objects as may hereinafter appear, this invention consists in the novel construction and arrangement of parts hereinafter to be described and then sought to be defined in the appended claims, reference being had to the accompanying drawing forming a part hereof, which shows, merely for the purposes of illustrative disclosure, a preferred embodiment of the invention, it being expressly understood, however, that changes may be made in practice without departing from the scope of the claims without digressing from the inventive idea.

Figure 2:
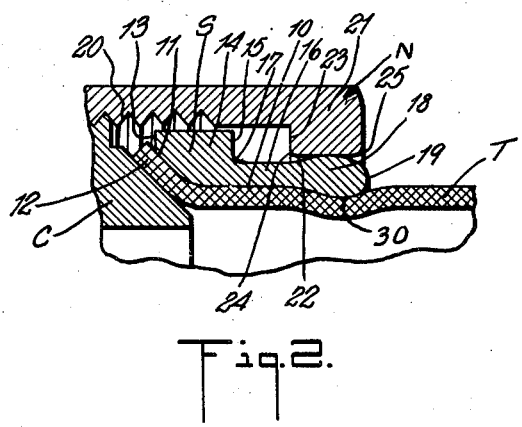

Referring to the drawing:

Fig. 1 shows a vertical elevation partially in section of coupling embodying the invention united with tubing; and Fig. 2 shows a sectional detail illustrating the parts during assembly.

Referring to the drawing, the sleeve S has a bore 10 whose diameter is admeasured for sliding fit with the tube or tubing T. A conical flared seat 11 is provided at one end of the sleeve S and serves as a seat for the flared end 12 of the tubing T. The inner end of the sleeve S has an annular flat portion 13 adjacent to its flared portion 12 and a cylindrical portion 14 adjacent to the flat portion 13. The cylindrical portion 14 terminates in an annular shoulder 15 for purposes presently to be described. The shoulder 15 is joined to a smaller diametered portion 16 of the sleeve S by a curved fillet 17. The smaller diametered portion 16 terminates at or adjacent to the opposite end of the sleeve S in a bulb-shaped ridge 18 projecting inwardly and outwardly of the sleeve surfaces and a rounded-off end 19 for purposes presently to be described.

The nut N has an internally threaded portion 20 of enlarged diameter and an annular inwardly projecting shoulder portion 21 defining an opening 22 of smaller diameter. This smaller diametered opening 22 defines an annular shoulder 23 at its inner end with which the shoulder 15 of the sleeve S is adapted to engage. The opening 22 is admeasured to be slightly smaller in diameter than the maximum external diameter of the bulb-shaped portion or ridge 18 of the sleeve S for purposes presently to be described. The shoulder portion 21 of the nut N has rounded upper and lower edges 24, 25 for purposes presently to be described.

A connector member C of conventional type is adapted to be screwed into the threaded portion 20 of the nut N. This connector C has a threaded plug portion 26 which is externally threaded to screw into the threaded portion 20 of the nut N. The inner end of this plug portion 26 is tapered at 26a complementary in shape to the flared seat 11 of the sleeve S and the outer end of the connector C is provided with a conventional hexagon wrench receiving portion 27. Connector C has a central bore or hole 28 which may be flared or tapered at 28a and threaded in its flared portion for attachment to conventional fittings (not shown).

In applying the three parts C, N and S just described to tubing T, the nut N is slidably mounted on the tubing T and the sleeve S is also slidably mounted on the tubing T. The tubing T is then flared at its inner end in conventional manner to provide the flare 12. The sleeve S is then moved forwardly until its seat 11 engages the flare 12 of the tubing T. The conical end 26a of the connector C is then inserted in the flared end 12 of the tubing. Then the nut N is moved forwardly on the tubing and then turned clockwise (looking at the right hand end of Figures 1 and 2 of the drawing) by hand so that its thread 20 engages the first few threads on the connector C. When the shoulder 23 of the nut N engages the shoulder 15 of the sleeve S, the rotation of the nut N in clockwise direction is continued by means of a wrench to force the inner surface of shoulder portion 21 of the nut N over the bulb-like ridge 18, of sleeve S, as shown in Fig. 2, thereby simultaneously deforming and pressing said bulb-like ridge 18 into the tubing T as illustrated in Figs. 1 and 2 and also forming a press fit between the tubing T and the sleeve S. Once the shoulder portion 21 of the nut N has passed over the ridge 18, the said nut N can swivel freely on the cylindrical portion 16 of the sleeve and continued rotation of the nut N in clockwise direction by the means of a wrench perfects a leak-proof joint between the conical end 26a of the connector C, the flare 12 on the tubing T and the seat 11 of the sleeve S. The curved edge 24 of the shoulder portion 21 on the nut N facilitates the forward movement of the nut over the bulb-shaped ridge 18 of the sleeve.

In order to disconnect the coupling, the nut N is rotated in counter-clockwise direction. In such motion the rounded-off portion 25 of the nut N is forced backwardly over the ridge 18, thus enabling the nut to be slid on tubing T for further dismantling of the parts.

It will be seen that with the coupling just described, the tubing T is protected against vibration at its vulnerable portion which is located near its flared end 12 because of the fact that the vibration in the tubing T is transferred from the tubing T through the pressed-in bulb end 18 of the sleeve S, to the nut N and further to the connector C, thus eliminating vibration from the weakened flared tubing end 12.

In conventional sleeves on nuts for flare fittings, there is ample clearance between such sleeves or nuts, and consequently the vibration reaches its maximum at the weakened flared end of the tubing. Experience has shown that tubes connected with conventional flared fittings or couplings, nearly all break near the flared end and thus cause costly interruption of services. With the coupling of this invention, however, all clearance between the tubing T and the sleeve S are eliminated at the portion where the bulb-like ridge 18 of the sleeve S is firmly pressed into the tubing T at 30, thus eliminating all vibration at the weakened flared end of the tubing T. Moreover, since the end 19 of the sleeve is smoothly rounded off at the bulb-like ridge 18, it cannot injure the metal of the tubing T. On the contrary, the slight reduction of the diameter of the tubing T effected when the bulb-like ridge 18 is pressed into it forms a slight annular corrugation at 30 and thereby adds strength to the tubing T at that point. The maximum amount of vibration in the tubing T now occurs relatively far removed from the weakened flared portion 12, namely, at 30 adjacent the bulb end 18 of the sleeve S. However, here the tubing T is entirely uninjured and even strengthened by the slight corrugation. Consequently, the life of the tubing T is prolonged, thus avoiding breakdowns of expensive equipment connected therewith.

The sleeve S is made of high tensile metal to resist maximum vibration. A substantial fillet 17 between the cylindrical portion 16 and the shoulder 15 further strengthens it to successfully absorb vibration. The sleeve S moreover can be reused whenever the coupling has been disconnected. In the event that the coupling has to be entirely removed from tubing T, unscrew nut N until the latter is forced backwards over ridge 18 as previously described, then slide nut N further backwards, and cut tubing T at end 19 of sleeve S. In order to remove the remaining portion of tubing T out of sleeve S, place the annular portion 13 of sleeve S on any kind of tubular support having a bore a little larger than the largest diameter of flare 12 of the end portion of tube T. Then use a short rod of a diameter equal to the normal or original outside diameter of tube T, apply it to the cut-off end of tube T protruding beyond end 19 of sleeve S, and drive the remaining portion of tube T, in the direction of the annular portion 13, out of sleeve S. In order to reuse sleeve S for the next application, spread end 19 of the sleeve slightly so as to facilitate the entering of tubing T to which the coupling is to be re-applied.

The coupling hereinbefore described has all the advantages just pointed out. Moreover, it is comparatively simple in construction and may be produced in quantity at comparatively low cost.

While a specific embodiment of the invention has been disclosed, variations in structural detail are possible and are contemplated. There is no intention, therefore, of limitation to the exact details shown and decribed.

What is claimed is:

1. A device for coupling flexible metallic tubing to other parts and to eliminate vibration at the flared end of such tubing comprising a sleeve movable over said tubing, a nut and a connector member, said sleeve having a seat at one end for receiving the flared end of said tubing, a bulb-like ridge at its opposite end and a cylindrical portion between its ends, of smaller diameter than either end and joining the first-named end with a curved fillet to provide absorption for vibrations and to define an annular shoulder, and said nut having an internally threaded portion and a portion whose diameter is admeasured to fit slidably on the said cylindrical portion of said sleeve and movable into abutting relationship with said shoulder but whose diameter is smaller than that of said bulb-like ridge, and said connector having a threaded plug portion to threadedly engage said internally threaded portion of said nut whereby when the parts are assembled and tightened together to draw said second-named portion of said nut over said bulb-like ridge and onto said cylindrical portion thereby pressing said bulb-like ridge into said tubing.

2. A device of the character described for coupling flexible metallic tubing to other parts and to eliminate vibration at the flared end of said tubing comprising a connector member adapted for attachment to said other parts, a sleeve movable over said tubing and a nut, said sleeve having a flat inner end portion with an inwardly extending tapered seat for receiving the flared end of said tubing, a bulb-like ridge projecting inwardly and outwardly of the sleeve and adjacent its outer end portion and a cylindrical portion intermediate said seat and said ridge of smaller diameter than either end portion and joining said inner end portion with a curved fillet and defining a shoulder adjacent the fillet, said nut having an internally threaded portion and an inwardly extending shoulder defining a cylindrical opening whose diameter is less than that of said ridge, and admeasured to fit slidably on said cylindrical portion of said sleeve, and said connector having an externally threaded portion for threaded engagement with the internally threaded portion of said nut and a conical portion for engagement in the flared end of said tubing, said inwardly extending shoulder of said nut having rounded edges whereby when said connector and said nut are tightened together said inwardly extending shoulder of said nut is drawn over said ridge onto said cylindrical portion of said sleeve thereby deforming and pressing said ridge into said tubing and thereafter said inwardly extending shoulder engages the sleeve shoulder to tighten said flared portion of said tubing against said seat by said conical portion to form leakproof seals between said conical portion and said flared end of said tubing and between the latter and said seat at said seat.

3. A device of the character described for coupling flexible metallic tubing to other parts and to eliminate vibration at the flared end of said tubing comprising a connector member adapted for attachment to said other parts, a sleeve movable over said tubing and a nut, said sleeve having a flat inner end portion with an inwardly extending seat for receiving the flared end of said tubing, a bulb-like ridge projecting inwardly and outwardly of the sleeve and adjacent its outer end portion and a cylindrical portion intermediate said seat and said ridge of smaller diameter than either end portion and joining said inner end portion with a curved fillet and defining a shoulder adjacent the fillet, said nut having a threaded portion and an inwardly extending shoulder defining a cylindrical opening whose diameter is less than that of said ridge, and admeasured to fit slidably on said cylindrical portion of said sleeve, and said connector having a threaded portion for threaded engagement with the threaded portion of said nut and a conical portion for engagement in the flared end of said tubing, said inwardly extending shoulder of said nut having rounded edges whereby when said connector and said nut are tightened together said inwardly extending shoulder of said nut is drawn over said ridge onto said cylindrical portion of said sleeve thereby deforming and pressing said ridge into said tubing and thereafter said inwardly extending shoulder engages the sleeve shoulder to tighten said flared portion of said tubing against said seat by said conical portion to form leakproof seals between said conical portion and said flared end of said tubing and between the latter and said seat at said seat.

FRANZ JACOBSON.

REFERENCES CITED

The following references are of record in the file of this patent:

UNITED STATES PATENTS

| Number | Name | Date |
|---|---|---|
| 1,680,080 | Benzion | Aug. 7, 1928 |

FOREIGN PATENTS

| Number | Country | Date |
|---|---|---|
| 80,299 | Sweden | May 1, 1934 |